March 4, 1941. T. M. VULLINGS Re. 21,740

HEATER FOR HOUSE TRAILERS

Original Filed July 1, 1937 2 Sheets-Sheet 1

Inventor
Theodore M. Vullings
By Lucas and Van Antwerp
Attorneys

March 4, 1941. T. M. VULLINGS Re. 21,740

HEATER FOR HOUSE TRAILERS

Original Filed July 1, 1937 2 Sheets-Sheet 2

Inventor
Theodore M. Vullings
By Lisman and Van Antwerp
Attorneys

Reissued Mar. 4, 1941

Re. 21,740

UNITED STATES PATENT OFFICE 21,740

HEATER FOR HOUSE TRAILERS

Theodore M. Vullings, Muskegon, Mich.

Original No. 2,139,141, dated December 6, 1938, Serial No. 151,345, July 1, 1937. Application for reissue June 26, 1939, Serial No. 281,231

10 Claims. (Cl. 126—56)

This invention relates generally to movable units for trailers and more particularly to a heating element mounted in the floor of a trailer.

Although I have hereinafter described my invention as typified in a heater unit nevertheless it might be utilized in combination with other devices, as, for instance, a ventilating or fresh air unit.

Briefly described, my invention relates to a heating unit which has its heat delivering surface facing the interior of a trailer and its working parts therebehind, the unit being movably mounted.

One purpose of my invention is to provide a maximum of space inside of the trailer when it is stationary, this being obtained by the substantially flush heater mounting.

Another advantage resides in my novel mounting construction whereby the heating unit may be readily moved to and from its operating position.

Another feature resides in my counterbalanced mounting for the unit together with its locking means.

Yet another advantage is my construction whereby entry of outside air may be had, Still another feature is my automatic safety release.

Other advantages and features will be readily understood as the description proceeds.

In the drawings.

Like numerals refer to like parts throughout the drawings.

Numeral 10 indicates a trailer having a floor 11. The floor 11 has an opening therethrough to receive my invention.

Figure 2:
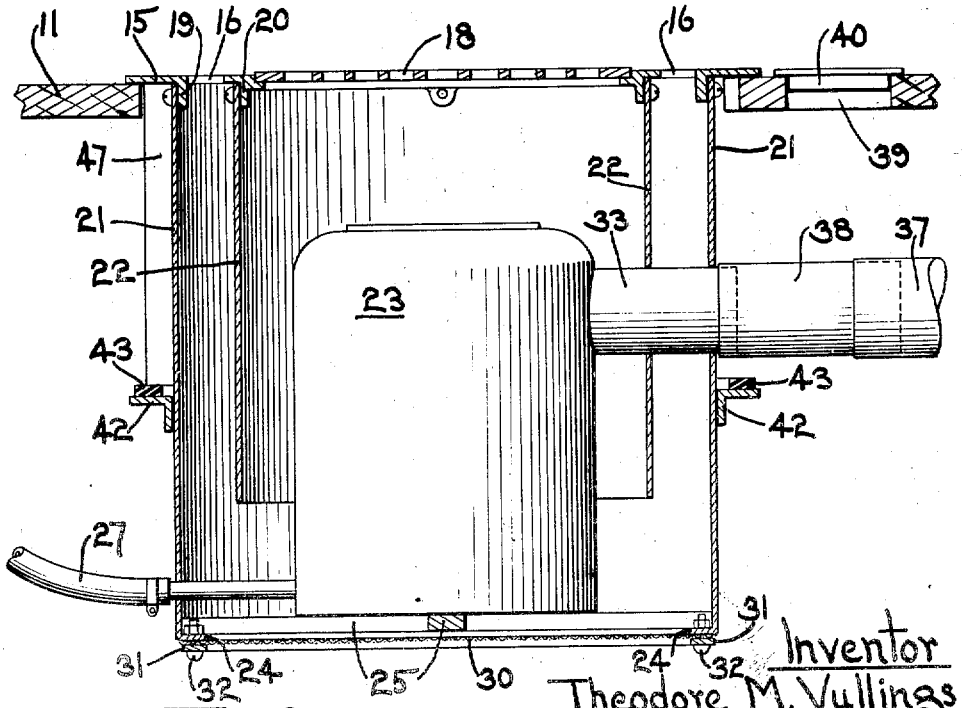
Fig. 2 is an enlarged fragmentary portion of Fig. 1.
Figure 3:
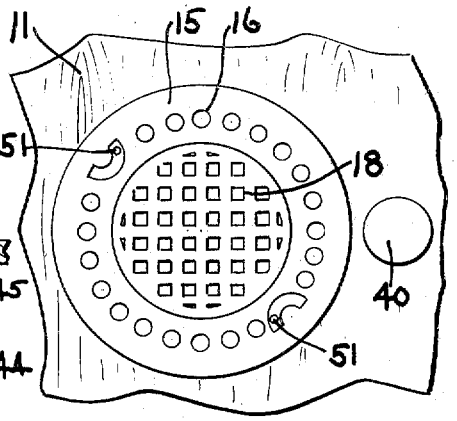
Fig. 3 is a plan view of my invention.

As shown in Fig. 3 of the drawings, a grille or register 15 has a plurality of openings 16 therein and a central opening. A second grille 18 fits the central opening. The outer register ring rests upon the floor 11 and has depending flanges 19 and 20, the former carrying the outer shell 21 of the furnace and the inner supporting the shorter inner shell 22. The openings 16 (see Fig. 2) serve to admit the cooler air from inside the trailer which is drawn downwardly between the shells and underneath shell 22.

A heating unit 23 is located inside of and spaced from the shell 22 and heats the air adjacent thereto thus causing it to rise through the register 18 to give a natural circulation in the trailer.

The lower end of the outer shell 21 is turned inwardly as indicated at 24 and cross bars 25 extend thereabove to serve as a mounting for the heating unit 23. Fuel is supplied to the unit 23 from reservoir 28 through flexible means 27. (See Fig. 1.)

Figure 4:
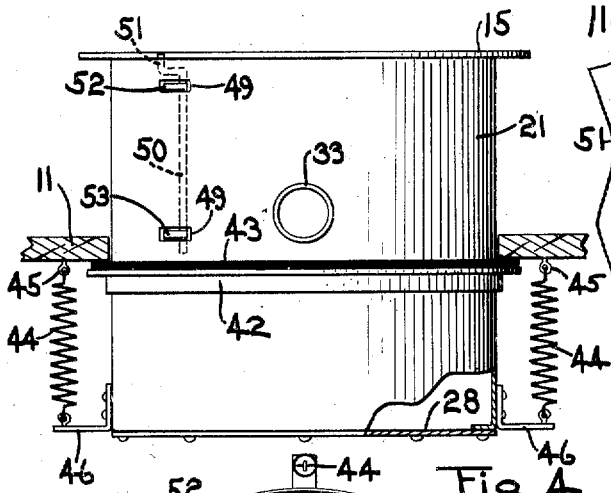
Fig. 4 is a sectional elevation through the trailer floor, the heating device being in its raised position.

A screen 30, detachably held in place by ring 31 and bolts 32, admits fresh air as desired. Also, this screen permits the dirt and dust which tends to collect in the heating chamber to gravitate therethrough. As shown in Fig. 4, a plate 28 may replace the screen.

A pipe 33 leads from the unit 23 through the casing 22 and slightly beyond casing 21.

Figure 1:
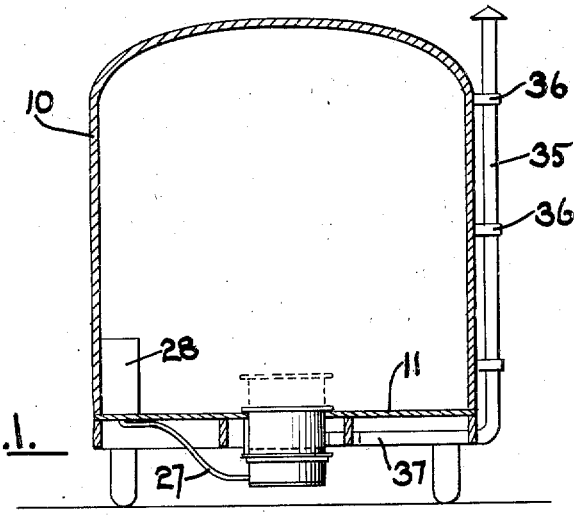
Fig. 1 is a sectional view through a trailer showing my invention installed therein.

A stack 35, see Fig. 1, is detachably held in place by flexible forked means 36 and its lower lateral portion 37 slidably receives a joint section 38.

This section 38 is accessible for movement through the small opening 39, normally closed by door 40.

A ring 42, carrying a soft rubber ring 43, is attached to the casing 21 and contacts against the underside of the floor 11, see Fig. 4, when the device rises to its upper position. Thus, a tight seal is had to prevent the entry of dust during movement of the trailer.

Springs 44, fastened at 45 to the underside of the floor and at 46 to the outer casing 21, urge the device to its upper position.

Figure 5:
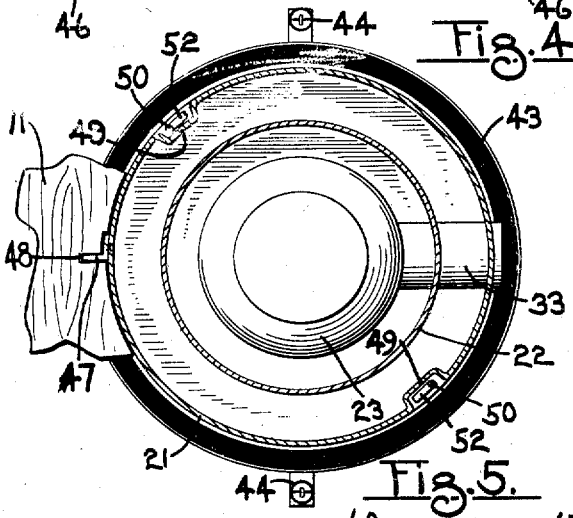
Fig. 5 is a sectional view through the heating unit.

A vertical angle member 47, see Fig. 5, rides in a notch 48 in the floor and prevents rotation of the device. Locking means, see Fig. 8 of the drawings, comprises a vertical rod 50 having a crank 51 to rotate the same and extensions 52 and 53 therebelow. Below these extensions it is extended forwardly of the device and terminates in a ball 54, a yieldable portion 55 being located adjacent the ball 54.

Figure 6:
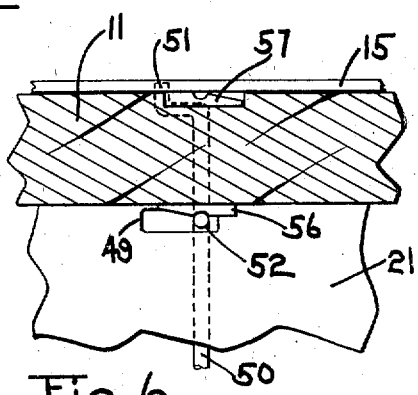
Fig. 6 is an enlarged sectional view illustrating the locking means.

Two of these locking means are necessary, see Fig. 3 of the drawings. The outer casing is indented at 49 to form bearings for the member 50 and housings for the arms thereon. See Figs. 4 and 5. The operating cranks 51 extend through crescent shaped slots in the register 15. When the unit is in its lower position, as shown in Fig. 2, the crank 51 is turned so as to bring the arm 52 underneath the floor 11 to seat within a block 56. See Fig. 6.

Release of the locking means, by manually rotating the crank 51, causes disengagement of the arm 52 and the block 56 thus permitting upward movement of the device to the position shown in Fig. 4. Whereupon, the crank 51 is again operated to bring the other arm 53 to seat in a second block 57, see Fig. 6, to thus prevent movement of the device during transportation of the trailer.

After the destination is reached, the locking means may be released and the device easily pushed downwardly against the action of the springs 44 by merely stepping upon the register and then it is locked in place.

Figure 7:
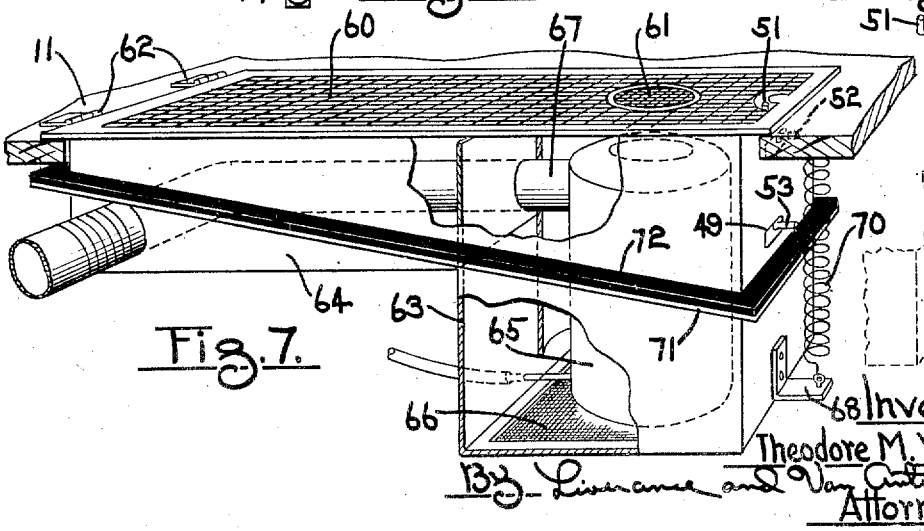
Fig. 7 is a perspective view of the preferred form of my invention.

Referring now to Fig. 7, this showing the preferred form of my invention, numeral 60 illustrates a grille, having a detachable disc 61 therein, pivotally hinged at one end as indicated at 62.

A casing 63, having a shallower portion 64, is attached to the grille or register 60 and carries the heating unit 65. The bottom of the casing 63 is perforated as indicated at 66 to admit fresh air as desired. Also, this perforated member permits the egress of dust and dirt and is a desirable feature of my invention. Suitable covering means is provided. A stack 67 leads from the heating unit 65 through the portion 64 of the casing and outwardly as shown.

A bracket member 68 extends from the casing 63 and a spring 70 connects thereto and to a point underneath the floor 11 to urge the device to an upper position. A strip 71, carrying the rubber sealing strip 72, extends as shown, and comes against the underside of the floor when the device is urged upwardly by means of the spring.

Figure 8:
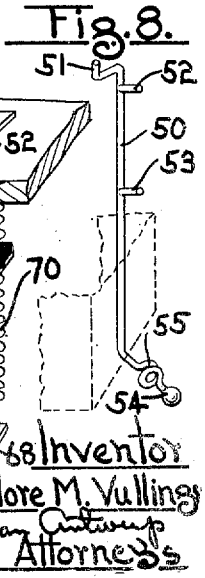
Fig. 8 is a perspective view of the locking means.

One of the automatic locking means, as shown in Fig. 8 of the drawings, is provided to cooperate in an identical manner as previously described, the arm 53 preventing downward movement of the device and the extension 52 preventing upward movement thereof.

In this form of invention it will be appreciated that the stack connection 67 can be permanently connected with the riser therefrom inasmuch as the relative movement of the different portions of the stack can be taken care of by means of a pair of elbows or flexible tubing.

However, it is oftentimes desirable to make a disconnectable joint in the combustion outlet or stack of the heater and when this construction occurs, it is, of course, absolutely necessary that accurate alinement be had between the two separable parts of the stack. By using the hinge mounting at one end of the heater, accurate alinement is had and thus there is no danger of leakage. In other words, the heater swings through an arc of exactly the same radius at all times. There is no variation in this arc. And, thus, alinement is had even though the angularity of the arc may become decreased for any reason since the alinement or telescoping of the disconnectable parts is in alinement with the longitudinal axis of the same.

The operation of my device is easily understood. As previously described the complete unit is movable from a position shown in Fig. 4, this being the position when the trailer is being moved, to a position as shown in Fig. 2.

Should the trailer be moved while the device is in its lower position, the locking lever 50 may become automatically unlocked due to any contact between the ball 54 and the obstruction. Contact therebetween causes rotation of the rod 50 with a consequent release of the arm 52 from its position underneath the floor, see Fig. 6, whereupon the spring or springs immediately urge the device upwardly. The spring 55 in the rod 50 lessens the shock of accidental contact. Thus breakage of the device is prevented.

Having thus described this invention what I claim as new and desire to secure by Letters Patent of the United States is:

1. In combination with a house trailer having an opening in the floor thereof, a heater, means for movably mounting the heater in said opening whereby it is movable therefrom to a position inwardly from its normal position so that it is more or less housed within the said trailer, spring means for moving the said heater to said position within the said trailer and means for holding it against movement by the said last mentioned means.

2. In a floor having a horizontal opening therethrough, a heater movably mounted to move through the opening, spring means tending to urge the heater to an upper position, means for locking the heater in its lower position, said locking means preventing operation of the said spring means.

3. In combination with a house trailer or the like having an opening in a wall thereof, a heater mounted for movements through the said wall to an inner position and to an outer position, spring means for urging this heater to one of its positions, means for locking the heater in its other position and trip means for releasing the said locking means.

4. In a trailer having a heating element movable to one position and capable of being latched against movement to the same position, the combination of automatic operable means, means cooperatively associated with said automatic means for releasing the latch, said automatic means including an element extending to close proximity with the ground for the purpose described.

5. A combination of elements as in claim 4 in which the automatic means has a vertical portion, and a yieldable extension at or near its lower extremity.

6. In combination, a trailer having a hole in the floor, a heater hinged at one edge of the hole and swingable to a position partly within the trailer, sealing means associated with the heater whereby it will be compressed between the heater and the trailer upon swinging movement of the heater to its inner position for the purpose described.

7. In a trailer floor having sills therebelow, and an opening therethrough, the combination of a heating assembly comprising a heater, box means carrying the heater and providing air passages therearound, hinged means between the assembly and the trailer floor whereby the assembly may be swung so as to lie above the lower plane of the sills, and means for locking the assembly in said upper position.

8. A combination as set forth in claim 7 in which trip means is provided for locking the assembly in its lower position, said trip means being operable by contact with the ground upon movement of the trailer.

9. In combination with a house trailer having an opening therethrough, a heater or the like located in said opening, hinge means attaching said heater onto the said house trailer whereby the heater may be swung to a plurality of positions relative to said opening for the purpose described, means for sealing the space between the edge of the opening and the heater when the heater is in one of its inner positions, said sealing means being rigidly attached onto the heater, and means for latching the heater in position.

10. In combination with a house trailer having an opening therethrough, a heater located in said opening, said heater having a small dimension in a direction perpendicular to the plane of the opening near one end thereof and a greater dimension near the other end thereof, hinge means between the small end of the heater and the edge of the opening whereby the heater may be swung inwardly and outwardly for the purpose described.

THEODORE M. VULLINGS.